United States Patent [19]

Yamada et al.

[11] Patent Number: 4,664,979

[45] Date of Patent: May 12, 1987

[54] MAGNETIC RECORDING MEDIUM

[75] Inventors: Yasuyuki Yamada; Yoshito Mukaida, both of Kanagawa, Japan

[73] Assignee: Fuji Photo Film Co., Ltd., Kanagawa, Japan

[21] Appl. No.: 647,564

[22] Filed: Sep. 5, 1984

[30] Foreign Application Priority Data

Sep. 5, 1983 [JP] Japan .................................. 58-162940

[51] Int. Cl.$^4$ .............................................. G11B 5/702
[52] U.S. Cl. .................................. 428/413; 252/62.54; 427/128; 428/418; 428/492; 428/521; 428/522; 428/694; 428/900; 428/425.9
[58] Field of Search ............... 428/421, 422, 900, 695, 428/694, 425.9, 413, 418, 522, 521, 492; 252/62.54; 427/128; 360/134-136

[56] References Cited

U.S. PATENT DOCUMENTS

| 4,388,376 | 6/1983 | Kubota | 428/900 |
| 4,444,838 | 4/1984 | Yamada | 428/425.9 |
| 4,454,202 | 6/1984 | Komine | 428/900 |

Primary Examiner—Ellis P. Robinson
Attorney, Agent, or Firm—Sughrue, Mion, Zinn, Macpeak and Seas

[57] ABSTRACT

A magnetic recording medium comprising a magnetic layer on a non-magnetic base, said magnetic layer containing ferromagnetic particles and a binder comprising (a) a copolymer of at least vinyl chloride and vinyl acetate, (b) a synthetic rubber selected from the group consisting of diolefinic and olefinic synthetic rubbers and (c) a resin selected from the group consisting of phenoxy resin and polyhydroxy ether ester resin.

33 Claims, No Drawings

MAGNETIC RECORDING MEDIUM

FIELD OF THE INVENTION

The present invention relates to magnetic recording media and, in greater detail, to magnetic recording media having excellent durability under conditions of high temperature and high humidity.

BACKGROUND OF THE INVENTION

Magnetic recording media have been used for various purposes in recent years requiring improved electromagnetic conversion characteristics and improved binder compositions.

However, conventional compositions cannot satisfy various competing requirements.

Known binders are composed of cellulose derivatives, vinyl chloride-vinyl acetate copolymers, polyurethane resin, acryl resin and copolymers thereof, vinylidene polymers and copolymers, epoxy resin, phenoxy resin, synthetic rubber and polyester, which are used alone or in combination of two components. Combinations of a polyurethane resin and a vinyl chloride-vinyl acetate copolymer and combinations of a polyurethane resin and nitrocellulose as described in, for example, U.S. Pat. Nos. 3,242,005, 3,630,771 and 4,152,484 are typical examples. However, when using a combination of two components, the adhesive strength and friction coefficient, which are the most fundamental properties of a magnetic recording medium, cannot both be simultaneously maintained at satisfactory levels.

In order to solve the above described problem, magnetic recording media having a three-component binder composition are described in Japanese Patent Publications Nos. 36647/82 and 36648/82. Although these attempts solve the above described problem to some extent, they do not succeed in preventing or reducing deterioration of S/N under conditions of high temperature and high humidity.

SUMMARY OF THE INVENTION

An object of the present invention is to provide magnetic recording media having excellent durability under conditions of high temperature and high humidity and, particularly, to media having reduced deterioration of video S/N.

As a result of many studies, the present inventors have found that this and other objects of the above invention can be attained by using a three-component binder containing a vinyl chloride-vinyl acetate copolymer, a diolefinic or olefinic synthetic rubber and a phenoxy resin or a linear polyhydroxy ether ester resin. This binder composition can be advantageously used in combination with a polyisocyanate as a hardening agent in a further embodiment of the invention.

Accordingly, the present invention relates to magnetic recording media comprising a magnetic layer coated on a non-magnetic base, in which the magnetic layer contains (a) a vinyl chloride-vinyl acetate copolymer, (b) a diolefinic or olefinic synthetic rubber and (c) a phenoxy resin or polyhydroxy ether ester resin. In addition, the present invention includes magnetic recording media in which the magnetic layer described above also contains a polyisocyanate.

DETAILED DESCRIPTION OF THE INVENTION

The vinyl chloride-vinyl acetate copolymer used in the present invention has an average degree of polymerization of about 250 to 1,000 and, preferably, of about 350 to 700, with a weight ratio of vinyl chloride to vinyl acetate of about 60–95:40–5 and, preferably, of about 70–90:30–10. This copolymer may optionally be copolymerized or graft-polymerized with additional monomers such as vinyl alcohol, maleic acid, maleic acid anhydride, acrylonitrile, acrylic acid, methacrylic acid, acrylic acid esters or methacrylic acid esters with vinyl alcohol and maleic acid being preferred. These monomers may be present in an amount of about 0.1 to 30% by weight and, preferably about 0.5 to 25% by weight based on the total polymer amount. The vinyl chloride-vinyl acetate copolymer can be prepared in a conventional manner (cf., e.g., S. Schildknecht: *Vinyl and Related Polymers*, John Wiley & Sons, p. 386 (1952)).

The diolefinic or olefinic synthetic rubber used in the present invention has an average molecular weight of about 100,000 to 2,500,000, and includes butadiene rubber, synthetic isoprene rubber, chloroprene rubber, acrylate-butadiene rubber, isobutene-isoprene rubber, acrylonitrile-butadiene rubber, acrylonitrile-chloroprene rubber, pyridine-butadiene rubber, styrene-butadiene rubber, styrene-chloroprene rubber, styrene-isoprene rubber, ethylene-propylene rubber and ethylene-1-butene rubber. Of these, acrylonitrile-butadiene rubber and styrene-butadiene rubber are preferred.

These synthetic rubbers can be prepared in a conventional manner (cf., e.g., C. Schildknecht: *Vinyl and Related Polymers*, John Wiley & Sons, p. 546 (1952)). They are preferably subjected to modification processing in order to improve their affinity to magnetic particles and magnetic particle dispersion, or to improve the crosslinking obtained with cross-linking agents.

Modification processing is carried out by copolymerizing the synthetic rubber with a suitable amount of a vinyl compound having at least one polar radical to introduce the polar radicals into the synthetic rubber molecule.

Examples of polar radicals include $-CO_2H$, $-OH$, $-SO_3H$, $-SO_3Na$, $>C=O$, $>C=C<$, $-NH_2$, $-NO$, $-CHO$ and $-NO_2$. Of these, $-CO_2H$, $-OH$, $-SO_3H$ and $-SO_2Na$ are preferred.

Examples of suitable vinyl compounds having polar radicals include acrylic acid, methacrylic acid, hydroxyethyl acrylate (or methacrylate), maleic acid (anhydride), fumaric acid, itaconic acid, vinylpyridine, vinylpyrrolidone, N,N-dimethylaminoethyl acrylate (or methacrylate), vinylbenzenesulfonic acid and acryloyl (or methacryloyl) ethylphosphate.

The amount of vinyl compound to be added is in a range of about 0.1 to 10% by weight, and preferably about 1 to 5% by weight, based on the total monomer mixture.

The phenoxy resin used in the present invention is represented by the following formula (I), and is commercially available as PKHH produced by UCC or DER-686 produced by Dow Chemical Co.

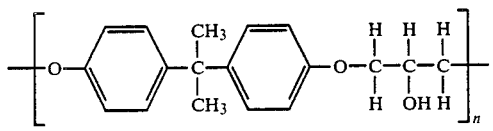

(wherein n represents an integer of about 50 to 150).

The linear polyhydroxy ether ester resin used in the present invention is represented by the following formula (II), and is commercially available as Epiclon H330, Epichlon H340 or Epiclon 350 produced by Dai-Nippon Ink & Chemicals Inc.

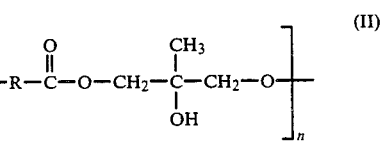

(wherein

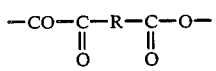

represents an ester of a dicarboxylic acid such as isophthalic acid, adipic acid or sebacic acid, and n is an integer of about 50 to 300, and preferably 80 to 200).

These binders have a blending ratio such that the amount of vinyl chloride-vinyl acetate copolymer is about 15 to 60% by weight and preferably about 30 to 50% by weight of the total binder, the diolefinic or olefinic synthetic rubber is about 20 to 65% by weight and preferably about 35 to 55% by weight of total and the phenoxy resin or linear polyhydroxyether ester resin is about 5 to 40% by weight and preferably about 10 to 30% by weight of the total.

When the amount of vinyl chloride-vinyl acetate copolymer included is less than about 15% by weight, dispersibility of magnetic particles is unacceptably reduced. When the amount included is more than about 60% by weight, fragile magnetic tapes are obtained and breakage such as cracks or peeling of a magnetic layer from a slit frequently occurs.

When the amount of diolefinic or olefinic synthetic rubber included is less than about 20% by weight, adhesion between the magnetic layer and the base is adversely affected. When it is more than about 65% by weight, surface properties deteriorate and the tapes frequently cause adhesion.

When the amount of the phenoxy resin or linear polyhydroxy ether ester resin included is less than about 5% by weight, still durability under high temperature and high humidity is reduced. When it is more than about 40% by weight, both adhesion between the base and the magnetic layer and the surface properties of magnetic layer deteriorate.

By adding a polyisocyanate to the above-described three-component binder composition, a firmer magnetic layer can be formed.

The polyisocyanate used in the present invention is a di-, tri- or tetraisocyanate selected from aliphatic, aromatic and alicyclic compounds having two or more —N=C=O groups per molecule.

Examples of the polyisocyanate include ethanediisocyante, butanediisocyanate, hexanediisocyanate, 2,2-dimethylpentanediisocyanate, 2,2,4-trimethylpentanediisocyanate, decanediisocyanate, ω,ω'-diisocyanate-1,3-dimethylbenzene, ω,ω'-diisocyanato-1,2-dimethylcyclohexane, ω,ω'-diisocyanato-1,4-diethylbenzene, ω,ω'-diisocyanato-1,5-dimethylnaphthalene, ω,ω'-diisocyanato-n-propylbiphenyl, 1,3-phenylenediisocyanate, 1-methylbenzene-2,4-diisocyanate, 1,3-dimethylbenzene-2,6-diisocyanate, naphthalene-1,4-diisocyanate, 1,1'-di-naphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzene-2,4,6-triisocyanate, 1,3,5-trimethylbenzene-2,4,6-triisocyanate, diphenylmethane-2,4,4'-triisocyanate, triphenylmethane-4,4',4''-triisocyanate, tolylenediioscyanate and 1,5-naphthylenediisocyanate; dimers and trimers of these isocyanates; and addition products of these isocyanates and dihydric or trihydric polyalcohols such as addition products of trimethylpropane and tolylenediisocyanate or hexamethylenediisocyanate.

Examples of preferred polyisocyanate include addition products of trimethylolpropane and tolylenediisocyanate or hexamethylenediisocyanate.

The above described binder components are added in an amount of about 8 to 100 parts by weight, preferably about 10 to 80 parts by weight, more preferably 13 to 50 parts by weight, based on 100 parts by weight of magnetic particles.

The polyisocyanate is added in an amount of about 5 to 80 parts by weight and preferably about 10 to 50 parts by weight based on 100 parts by weight of the other three binder components.

The magnetic recording medium according to the invention may also contain conventional additives such as lubricants, organic solvents, abrasives, antistatic agents and other additives. Such additives, along with suitable bases and a process for preparing the magnetic recording media of the present invention are described in Japanese Patent Publication No. 26890/81.

In the following, the present invention is illustrated in greater detail with reference to Examples. It will be easily understood by persons skilled in the art that the components, amounts and order of processing shown in these Examples can be modified within the scope of the present invention, and accordingly, the present invention is not to be construed as being limited to the following Examples.

In Examples, all parts, percents and ratios are by weight, unless otherwise indicated.

EXAMPLE 1

| | |
|---|---|
| (A) Magnetic material<br>Co containing γ-Fe$_2$O$_3$<br>(Hc: 630 Oe; particle size:<br>0.4 × 0.05 × 0.05 μm) | 300 parts |
| (B) Vinyl chloride-vinyl acetate copolymer<br>Vinyl chloride-vinyl acetate-maleic<br>acid copolymer (ratio by weight: | 25 parts |

-continued

| | | |
|---|---|---|
| | 86:13:1; average degree of polymerization: 410) | |
| (C) | Synthetic rubber Acrylonitrile-butadiene copolymer (ratio by weight: 30:70; average molecular weight: 300,000) | 40 parts |
| (D) | Phenoxy resin PKHH produced by UCC Co. (average molecular weight: 35,000) | 13 parts |
| (E) | Electrically conductive carbon black (average particle size: 30 mμ) | 20 parts |
| (F) | Oleic acid | 3 parts |
| (G) | Lecithin | 3 parts |
| (H) | Methyl ethyl ketone/toluene mixed solvent (ratio by weight of mixture: 1:1) | 700 parts |

The above described composition was blended for 48 hours in a ball mill to obtain a dispersion. A solution of 18 parts of a 75 wt% solution of (I) a tri-functional polyisocyanate compound obtained by reacting 3 mols of toluenediisocyanate with 1 mol of trimethylolpropane in ethyl acetate (Desmodur L-75, produced by Bayer A.G.) in 200 parts of the MEK/toluene solvent described above was added to the dispersion and further blended to obtain a magnetic coating solution. This solution was applied to a polyester base having a thickness of 15μ so as to result in a dry thickness of 5μ and after drying was subjected to surface molding by calender rolls.

The resulting broad magnetic material was cut into ½ inch widths to produce magnetic tapes, designated as Example No. 1.

EXAMPLES 2-5

Samples No. 2-5 were produced in the same manner as in Example 1, having the composition (A), (B), (C), (D) and (E) as shown in Table 1.

COMPARATIVE EXAMPLES 1-5

Samples were produced in the same manner using the same amounts as in Examples 1-5, except that the component (C) was changed as shown in Table 2, respectively, to produce Comparative Examples No. 1-5.

TABLE 2

| Comparataive Example | Component (C) |
|---|---|
| C-1 | Butyleneadipate-tolylenediisocyanate polyurethane: $\overline{M}w$: 100,000 |
| C-2 | Butyleneadipate-tolylenediisocyanate polyurethane: $\overline{M}w$: 80,000 |
| C-3 | Hexaneadipate-tolylenediisocyanate polyurethane: $\overline{M}w$: 130,000 |
| C-4 | Hexaneadipate-tolylenediisocyanate polyurethane: $\overline{M}w$: 80,000 |
| C-5 | Butyleneadipate-diphenylmethanediisocyanate polyurethane: $\overline{M}w$: 110,000 |

The video sensitivity, video S/N and reduction of video S/N were measured for these examples and comparative examples after a sample tape was repeated in 100 times under the conditions of 23° C. and 70% RH and of 40° C. and 80% RH, and the results shown in Table 3 were obtained.

TABLE 3

| Sample | Video Sensitivity | Video S/N | Reduction of video S/N after 100 passes (dB) | |
|---|---|---|---|---|
| | | | 23° C., 70% RH | 40° C., 80% RH |
| Example | | | | |
| No. 1 | 0 | 0 | −0.11 | −0.1 |
| No. 2 | +0.1 | +0.1 | −0.1 | −0.2 |
| No. 3 | −0.1 | −0.1 | −0.3 | −0.3 |
| No. 4 | 0 | −0.1 | −0.2 | −0.4 |
| No. 5 | −0.1 | +0.1 | −0.2 | −0.3 |
| Comparative Example | | | | |
| No. 1 | 0 | −0.1 | −0.2 | −0.9 |
| No. 2 | −0.1 | −0.1 | −0.2 | −1.0 |
| No. 3 | −0.2 | −0.2 | −0.3 | −1.3 |

TABLE 1

| Example | (A) | (B) | (C) | (D) | (E) |
|---|---|---|---|---|---|
| 2 | Fe—Co Alloy BET Relative Surface Area: 38 m²/g 300 parts | Vinyl Chloride-Vinyl Acetate-Vinyl Alcohol Copolymer (87:10:3 by weight) Average Degree of Polymerization: 450 35 parts | Acrylonitrile-Butadiene-Acrylic Acid Copolymer (27:70:3 by weight) Average molecular weight: 230,000 20 parts | Epiclon H330 manufactured by Dai Nippon Ink & Chemicals Inc. 20 parts | Same as Example 1 18 parts |
| 3 | Co—Containing Fe₃O₄ 300 parts | Same as Example 1 25 parts | Styrene-Butadiene-Acrylic Acid Copolymer (23.5:73.5:3.5 by weight) Average molecular weight: 200,000) 40 parts | Same as Example 1 13 parts | Same as Example 1 18 parts |
| 4 | Same as Example 1 300 parts | Same as Example 2 35 parts | Same as Example 2 25 parts | Epiclon H350 manufactured by Dai Nippon Ink & Chemicals, Inc. 13 parts | Same as Example 1 10 parts |
| 5 | Same as Example 1 300 parts | Vinyl Chloride-Vinyl Acetate-Vinyl Alcohol Copolymer (91:3:6 by weight) Average Degree of Polymerization: 420 35 parts | Same as Example 3 30 parts | Same as Example 1 18 parts | Same as Example 1 15 parts |

TABLE 3-continued

| Sample | Video Sensitivity | Video S/N | Reduction of video S/N after 100 passes (dB) | |
|---|---|---|---|---|
| | | | 23° C., 70% RH | 40° C., 80% RH |
| No. 4 | −0.2 | −0.2 | −0.3 | −1.1 |
| No. 5 | −0.1 | 0 | −0.4 | −0.8 |

Video sensitivity (dB) is shown as a relative value, when the video sensitivity of Example No. 1 is used as a standard of ±0 dB.

Video S/N (dB) is shown as a relative value when the video S/N of Example No. 1 is used as a standard of ±0 dB.

Reduction of vide S/N after 100 passes (dB) was determined by measuring the reduction of video S/N after a sample tape having a length of 5-minutes was repeatedly run 100 times, using the initial video S/N of each sample as a standard of ±0 dB (measurements were carried out after running the sample at 23° C. and 70% RH and at 40° C. 80% RH).

It is understood from Table 3 that binders composed of three components in Examples of the present invention show remarkably improved video S/N reduction after repeated runs at a high temperature and a high humidity of 40° C. and 80% RH, when compared with samples having the known binder composition shown in the Comparative Examples.

While the present invention has been described in detail and with reference to specific embodiments thereof, it will be apparent to one skilled in the art that various changes and modifications can be made therein without departing from the spirit and scope thereof.

What is claimed is:

1. A magnetic recording medium comprising a magnetic layer on a non-magnetic base, said magnetic layer containing ferromagnetic particles and a binder comprising (a) a copolymer of at least vinyl chloride and vinyl acetate wherein the weight ratio of vinyl chloride to vinyl acetate is from about 60–96.8:40–3.2, (b) a synthetic rubber selected from the group consisting of diolefinic and olefinic synthetic rubbers and (c) a resin selected from the group consisting of phenoxy resin and polyhydroxy ether ester resin, wherein said copolymer of vinyl chloride and vinyl acetate is present in an amount of from about 15–60% by weight, said synthetic rubber is present in an amount of from about 20–65% by weight, and said resin is present in an amount of from about 5–40% by weight, based on the total weight of said binder composition.

2. The magnetic recording medium claimed in claim 1, wherein said magnetic layer contains a polyisocyanate.

3. The magnetic recording medium claimed in claim 1, wherein the weight ratio of vinyl chloride to vinyl acetate in said copolymer is from about 60–95:40–5.

4. The magnetic recording medium claimed in claim 3, wherein said weight ratio of vinyl chloride to vinyl acetate is from about 70–90:30–10.

5. The magnetic recording medium claimed in claim 3, wherein said copolymer of vinyl chloride and vinyl acetate has an average degree of polymerization of about 250 to 1,000.

6. The magnetic recording medium claimed in claim 5, wherein said copolymer of vinyl chloride and vinyl acetate has an average degree of polymerization of about 350 to 700.

7. The magnetic recording medium claimed in claim 1, wherein said copolymer of vinyl chloride and vinyl acetate further comprises a monomer selected from the group consisting of vinyl alcohol, maleic acid, maleic acid anhydride, acrylonitrile, acrylic acid, methacrylic acid, acrylic acid esters and methacrylic esters.

8. The magnetic recording medium as claimed in claim 7, wherein said monomer is selected from the group consisting of vinyl alcohol and maleic acid.

9. The magnetic recording medium claimed in claim 7, wherein said monomer is present in an amount of about 0.1 to 30% by weight based on the total weight of the copolymer composition (a).

10. The magnetic recording medium claimed in claim 9, wherein said monomer is present in an amount of about 0.5 to 25% by weight, based on the total copolymer composition (a).

11. The magnetic recording medium claimed in claim 1, wherein said synthetic rubber is selected from the group consisting of butadiene rubber, synthetic isoprene rubber, chloroprene rubber, acrylonitrile-butadiene rubber, acrylonitrile-chloroprene rubber, pyridine-butadiene rubber, styrene-butadiene rubber, styrene-chloroprene rubber, styrene-isoprene rubber, ethylene-propylene rubber and ethylene-1-butene rubber.

12. The magnetic recording medium claimed in claim 1, wherein said synthetic rubber is selected from the group consisting of acrylonitrile-butadiene rubber and styrene-butadiene rubber.

13. The magnetic recording medium claimed in claim 1, wherein said synthetic rubber has an average molecular weight of about 100,000 to 2,500,000.

14. The magnetic recording medium claimed in claim 11, wherein said synthetic rubber further comprises a copolymerizable vinyl compound having a polar radical.

15. The magnetic recording medium claimed in claim 14, wherein said polar radical is selected from the group consisting of $-CO_2H$, $-OH$, $-SO_3H$, $-SO_3Na$, $>C=O$, $>C=C<$, $-NH_2$, $-NO$, $-CHO$ and $NO_2$.

16. The magnetic recording medium claimed in claim 15, wherein said polar radical from the group consisting of $-CO_2H$, $-OH$, $-SO_3H$, and $-SO_3Na$.

17. The magnetic recording medium claimed in claim 14, wherein said vinyl compound having a polar radical is selected from the group consisting of acrylic acid, methacrylic acid, hydroxyethyl acrylate, hydroxyethyl methacrylate, maleic acid, maleic acid anhydride, fumaric acid, itaconic acid, vinylpyridine, vinylpyrrolidone, N,N-dimethylaminoethyl acrylate, N,N-dimethylaminoethyl methacrylate, vinyl-benzenesulfonic acid, acryloyl, ethylphosphate and methacryloyl ethylphosphate.

18. The magnetic recording medium claimed in claim 17, wherein said vinyl compound having a polar radical is selected from the group consisting of isophthalic acid, adipic acid and sebacic acid.

19. The magnetic recording medium claimed in claim 14, wherein said vinyl compound is present in an amount of from about 0.1 to 10% by weight, based on the total weight of synthetic rubber (B).

20. The magnetic recording medium claimed in claim 19, wherein said vinyl compound is present in an amount of from about .1 to 5% by weight, based on the total weight of synthetic rubber (B).

21. The magnetic recording medium claimed in claim 1, wherein said phenoxy resin is represented by the following formula (I):

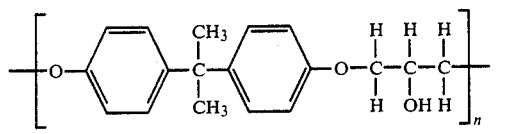

wherein n represents an integer of about 50 to 150.

22. The magnetic recording medium claimed in claim 1, wherein said linear polyhydroxy ether ester resin is represented by the following formula (II):

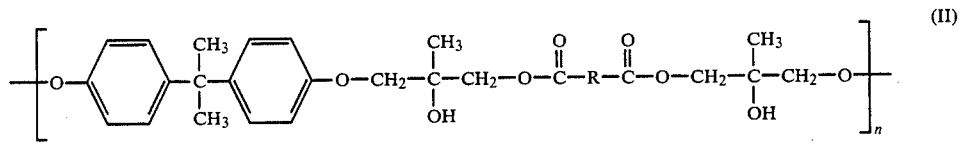

wherein

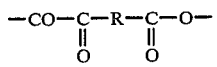

represents an ester of a dicarboxylic acid, and n is an integer of about 50 to 300.

23. The magnetic recording medium as claimed in claim 22, wherein n is an integer of about 80 to 200.

24. The magnetic recording medium claimed in claim 1, wherein said binder is present in an amount of from about 10 to 80 parts by weight, based on 100 parts by weight of said magnetic particles.

25. The magnetic recording medium claimed in claim 1, wherein said copolymer of vinyl chloride and vinyl acetate is present in an amount of from about 30–50% by weight based on the total weight of said binder composition.

26. The magnetic recording medium claimed in claim 1, wherein said synthetic rubber is present in an amount of from about 35 to 55% by weight based on the total weight of said binder composition.

27. The magnetic recording medium claimed in claim 1, wherein said resin is present in an amount of from about 10 to 30% by weight based on the total weight of said binder composition.

28. The magnetic recording medium claimed in claim 2, wherein said polyisocyanate is a diisocyanate, triisocyanate or tetraisocyanate selected from the group consisting of aliphatic aromatic and alicyclic compounds having two or more —N=C=O groups per molecule.

29. The magnetic recording medium claimed in claim 28, wherein said polyisocyanate is selected from the group of ethanediisocyanate, butanediisocyanate, hexanediisocyanate, 2,2-dimethylpentanediisocyanate, 2,2,4-trimethylpentanediisocyanate, decanediisocyanate, ω,ω'-diisocyanate-1,3-dimethylbenzene, ω,ω'-diisocyanato-1,2-dimethylcyclohexane, ω,ω'-diisocyanato-1,4-diethylbenzene, ω,ω'-diisocyanato-1,5-dimethylnaphthalene, ω,ω'-diisocyanato-n-propylbiphenyl, 1,3-phenylenediisocyanate, 1-methylbenzene-2,4-diioscyanate, 1,3-dimethylbenzene-2,6-diioscyanate, naphthalane-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzene-2,4,6-triisocyanate, 1,3,5-trimethylbenzene-2,4,6-triisocyanate, diphenylmethane-2,4,4'-triisocyanate, triphenylmethane-4,4',4''-triisocyanate, tolylenediisocyanate and 1,5-naphthylenediisocyanate; dimers and trimers of these isocyanates; and addition products of these isocyanates and dihydric or trihydric polyalcohols.

30. The magnetic recording medium as claimed in claim 2, wherein said polyisocyanate is selected from the group consisting of addition products of trimethylolpropane and tolylenediisocyanate or hexamethylenediisocyanate.

31. The magnetic recording medium claimed in claim 28, wherein said polyisocyanate is present in an amount of from about 5 to 80 parts by weight by weight per 100 parts by weight of total binder components (a), (b) and (c).

32. The magnetic recording medium claimed in claim 31, wherein said polyisocyanate is present in an amount of from about 10 to 50 parts by weight based upon 100 parts by weight of total binder components (a), (b) and (c).

33. The magnetic recording medium claimed in claim 1, wherein said binder is present in an amount of from about 8 to 100 parts by weight, based on 100 parts by weight of said ferromagnetic particles.

* * * * *